United States Patent [19]
Sidney

[11] Patent Number: 5,657,605
[45] Date of Patent: Aug. 19, 1997

[54] METAL LATTICE

[75] Inventor: Kenneth Jammes Sidney, Ballina, Australia

[73] Assignee: Metalat Holdings Pty., New South Wales, Australia

[21] Appl. No.: 596,140

[22] PCT Filed: Aug. 22, 1994

[86] PCT No.: PCT/AU94/00496

§ 371 Date: Feb. 20, 1996

§ 102(e) Date: Feb. 20, 1996

[87] PCT Pub. No.: WO95/06174

PCT Pub. Date: Mar. 2, 1995

[30] Foreign Application Priority Data

Aug. 20, 1993 [AU] Australia ................. 44776/93
Jan. 19, 1994 [AU] Australia ................. PM3441

[51] Int. Cl.$^6$ ............................................. E04C 2/42
[52] U.S. Cl. ............... 52/664; 52/665; 52/745.05; 52/745.19; 403/188; 403/201; 403/400; 403/408.1
[58] Field of Search ............ 52/664, 665, 745.19, 52/745.05; 403/188, 201, 400, 408.1

[56] References Cited

U.S. PATENT DOCUMENTS 3,380,203  4/1968  Peterschmidt ................ 52/664
3,540,178  11/1970 Altissimo .
4,723,388  2/1988  Zieg ........................... 52/664
4,821,481  4/1989  Woodman .
5,069,009  12/1991 Suzuki ......................... 52/664

FOREIGN PATENT DOCUMENTS 16931    12/1988  Australia .
30847    10/1989  Australia .
642387   10/1993  Australia .
1560097   3/1969  France .
1484090   5/1971  Germany .
149790    5/1985  Japan .
60-148632  8/1985 Japan .
60-82239  10/1985 Japan .

*Primary Examiner*—Christopher Todd Kent
*Attorney, Agent, or Firm*—Hoffman, Wasson & Gitler

[57] ABSTRACT

A metal lattice is provided which is formed of over-lying slats of hollow tubular form. The slats are provided with apertures in opposite side faces so that when fastened together by a rivet, the rivets are hidden from one side. In an alternative connection arrangement, the slats may be provided with tongues for location in slots in the slats. A method and apparatus for manufacturing the metal lattice is also disclosed.

11 Claims, 8 Drawing Sheets

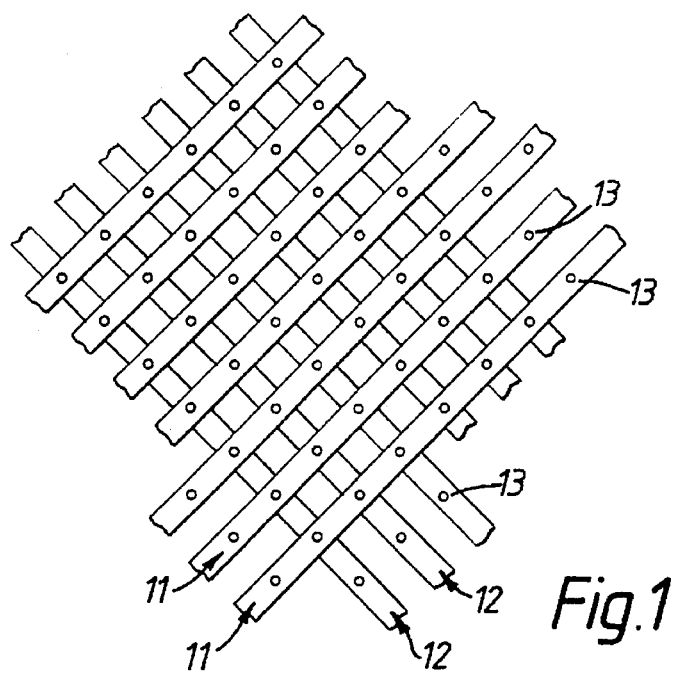
Fig.1
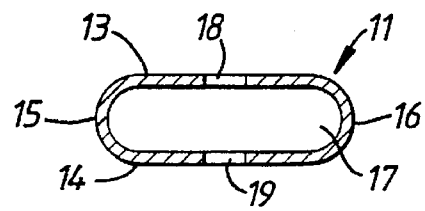
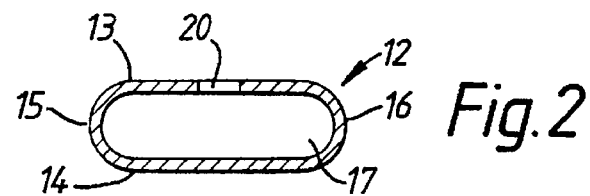
Fig.2
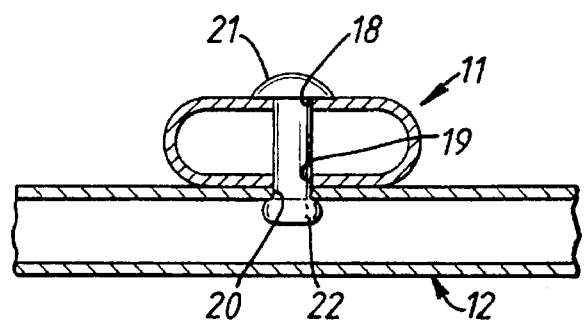
Fig.3

METAL LATTICE

TECHNICAL FIELD

THIS INVENTION relates to metal lattice and to a method and means for the manufacture of such lattice.

BACKGROUND ART

The materials most commonly used in the manufacture of lattice comprise slats or strips of timber. The use of timber for the making of lattice has proven to be labour intensive and expensive to paint and maintain. If the exposed surfaces of the timber lattice are not painted or in some other way protected, the appearance of the lattice becomes shabby and aesthetically unacceptable due to weathering.

SUMMARY OF THE INVENTION

The present invention aims to overcome or alleviate the above disadvantages or at least provide an alternative to the known lattice by providing improved lattice and a method and means for the manufacture of same. Other objects and advantages of the invention will become apparent from the following description.

The present invention thus provides in a first aspect a method of manufacturing metal lattice comprising a plurality of first and second slats, said slats being formed from metal strips and having a hollow cross section and opposite side faces, said method including the steps of forming apertures in said strips such that the opposite side faces of said first slats have aligned apertures in opposite side faces and said second slats have apertures in one said side face, placing said first slats in an overlying relationship to said second said slats so that said apertures are aligned, and interconnecting said first and second slats by fastener means passed through said apertures in said first and second slats.

In a second aspect, the present invention provides metal lattice comprising a plurality of first and second slats, said slats having a hollow cross section and opposite side faces, said first slats having aligned apertures in opposite side faces and said second slats having apertures in one side face, said first slats overlying said second slats so that said apertures are aligned, said slats being interconnected by fastener means passing through said apertures in said first and second slats.

Suitably, the slats are formed from continuous strips of sheet metal which are roll formed into a hollow profile or form. Such apertures as referred to above are formed at spaced apart locations along the slats so as to enable interconnection between a plurality of slats.

For forming the apertures in the strips of sheet material, punching apparatus is provided, the punching apparatus being operated such as to ensure that the apertures in the strips are punched at an even spacing. The apertures in the strip are suitably punched during movement of the strip from a storage location for example on a roll to the roll forming apparatus. For this purpose the punching apparatus includes a punching device which is supported on a movable carriage and the carriage of the punching device is movable with the strip. Actuating means are provided for causing actuation of the punching device to cause its operation, the actuating means being actuable upon movement of the carriage a predetermined distance. Sensing means are provided to sens movement of the carriage the predetermined distance. Suitably the sensing means is a limit switch. The punching device is suitably actuated by a pneumatic actuator and the sensing means causes operation of a valve to supply air to the actuator.

Positioning means are provided for correctly positioning the punching device. The positioning means suitably includes a probe or pin which is connected to the carriage of the punching device and which is locatable in a previously formed aperture in the strip such as to cause the carriage to be positioned in a fixed attitude relative to a previously formed aperture prior to operation of the punching device. Releasing means are provided to release the probe or pin from the aperture and returning means are provided to return the carriage to its initial position.

The hollow profile formed by roll forming is substantially of C-section or closed tubular form in cross section with substantially flat opposite side faces.

Preferably, the slats which contain aligned apertures on their opposite side faces have their apertures on their sides adjacent the overlying slats of larger size or diameter than the apertures on the opposite side to facilitate insertion of the fasteners and alignment with the apertures in the overlain slats.

In yet a further aspect, the present invention provides a method of manufacturing metal lattice comprising a plurality of slats, said slats being formed from metal strips and having a hollow cross section and opposite side faces, said method including the steps of punching said strips to form in said slats apertures in adjacent side faces of said slats, placing said first slat in an overlying relationship to said second said slat so that said apertures are aligned, and interconnecting said first and second slats at said apertures.

Preferably, the strips are punched to form tongues adjacent the apertures in the first slats, the tongues being inserted into the apertures, in the second slats to interconnect the slats. Preferably also the apertures in the second slats comprise slots and recesses are formed in the second slats rearwardly of the slots to receive the tongues of said the slats.

The tongues, slots and recesses in the strips may be formed using the above described punching apparatus.

In yet a further aspect, the present invention provides metal lattice comprising a plurality of first and second slats, said slats having a hollow cross section and opposite side faces, said first slats having tongues projecting from one side face and said second slats having apertures in one side face, said first slats overlying said second slats so that said tongues of said first slats project into said apertures in said second slats to interconnect said slats.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 1 illustrates lattice formed in accordance with the present invention;

FIG. 2 illustrates in sectional view the configuration of the slats of the lattice on opposite sides thereof;

FIG. 3 illustrates in sectional view the manner of interconnection of the slats of FIG. 2;

DETAILED DESCRIPTION OF THE EMBODIMENTS

Figure 4:
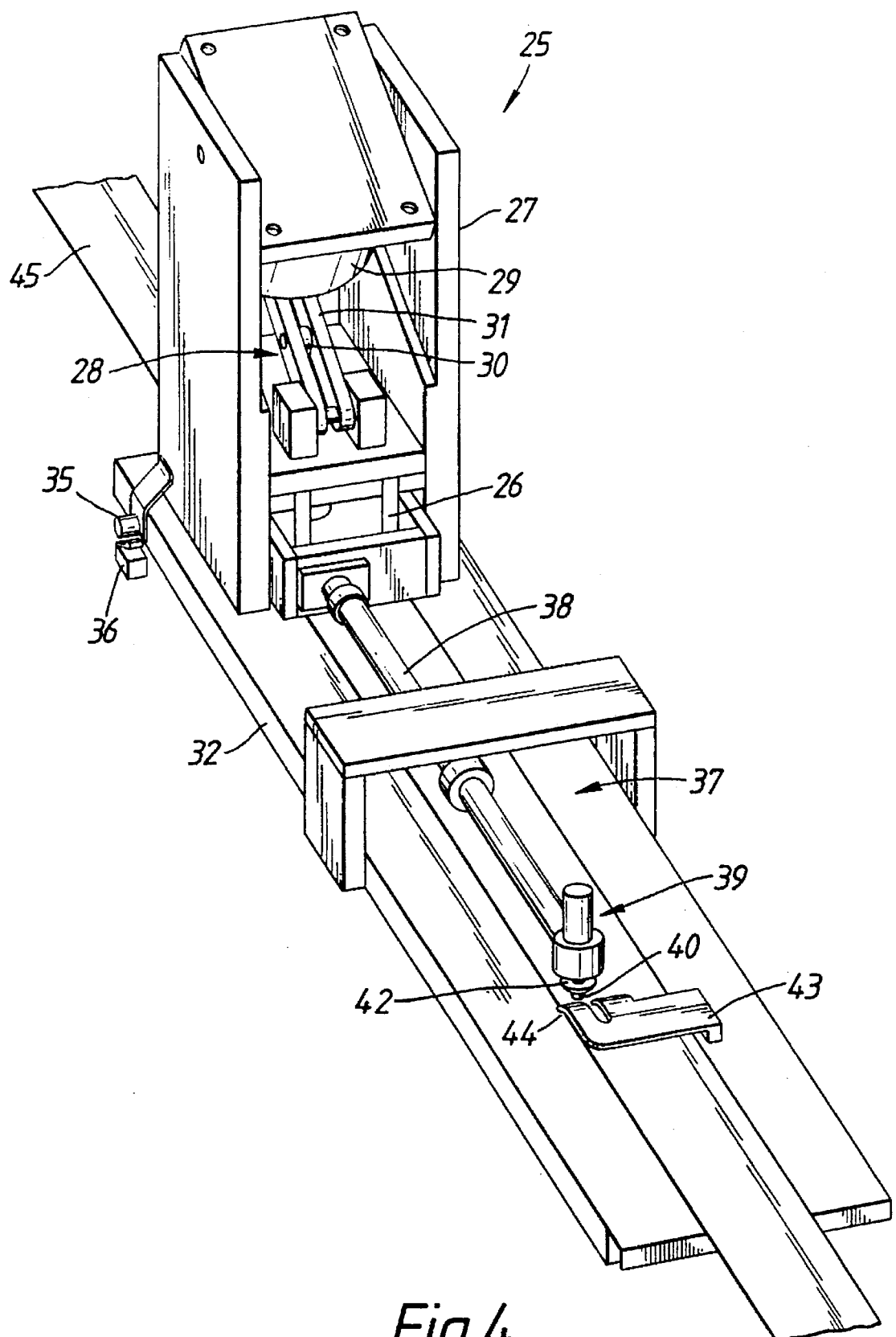
FIG. 4 illustrates the preferring punching apparatus for forming the apertures in the strip.

Referring to the drawings and firstly to FIG. 1, there is illustrated a portion of a lattice 10 formed in accordance with the present invention comprising of a set of metal slats 11 arranged in a parallel, mutually spaced orientation which overlay another set of metal slats 12 which are also arranged in parallel mutually spaced orientation so as to cross the slats 11 substantially at right angles thereto.

As more clearly shown in FIG. 2, the slats 11 and 12 are of identical, hollow tubular construction having two principally flat sides 13 and 14 integrally joined by two curved ends 15 and 16 to form a hollow space 17 therein. The opposite sides 13 and 14 of the slat 11 are formed with aligned openings or holes 18 and 19 which communicate with the space 17. The holes 13 are located at regular intervals along the sides 13 and 14 of the slats 11. The holes 19 on one side of the slats 11, namely the side of the slats 11 adjacent the slats 12, may have a larger diameter to facilitate interconnection as described further below.

The slat 12 is similarly formed with holes or openings 20 at intervals therealong which in this instance are only formed in one of the sides 13 of the slats 12 to communicate with the hollow space 17. These intervals match the centre-to-centre spacings of the openings 18 and 19 of the slats 11

For assembly of the lattice 10, the slats 11 are arranged in mutually parallel relationship as are the slats 12 and overlaid so that at each crossing of a slat 11 and 12, a hole 20 in the slat 12 and the two holes 18 and 19 in the slat 11 are aligned as shown in FIG. 3. In this configuration, any suitable fasteners 21 may be passed through the openings 18 and 19 in the slats 11 to extend into the opening 20 in the slats 12 to secure the slats 11 and 12 together at this crossing. The enlarged opening 19 facilitates this engagement by permitting some lateral movement of the fastener 21 facilitating its alignment with the opening 20 in the slat 12 for passing therethrough. The fasteners 21 suitably comprise rivets however other fasteners may be employed. As shown where rivets are used, they are expanded as at 22 within the hollow space 17 behind the side 14 thereof to secure the slats 11 and 12 together. It will be thus apparent that from one side of the lattice 10, namely the side of the slats 12, the fasteners 21 will be hidden from view.

Figure 5:
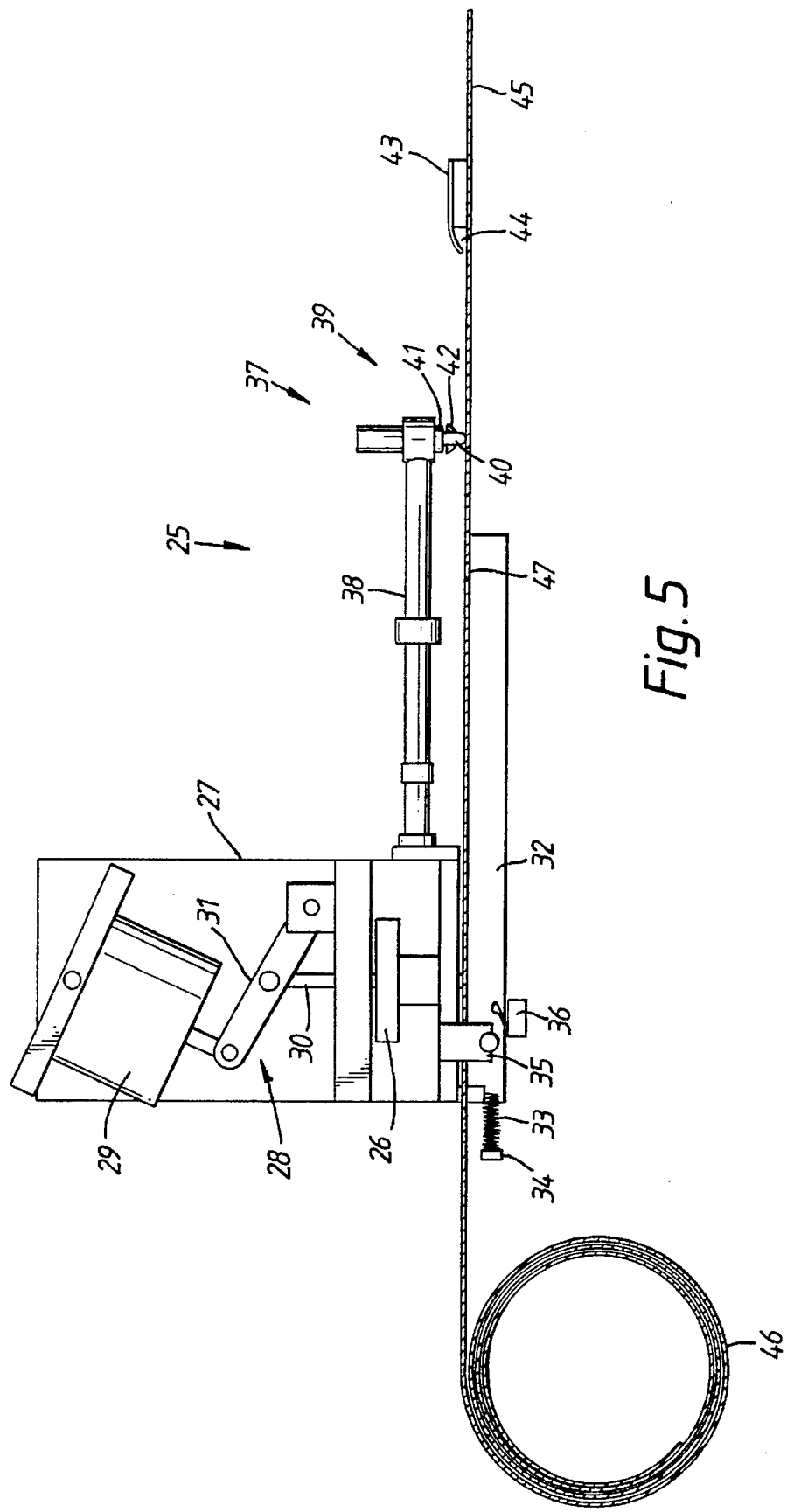
FIGS. 5 to 8 illustrate the operation of the punching apparatus.

The slats 11 and 12 as stated above are suitably formed from sheet metal strip which has been prepunched at spaced apart positions to form the openings 18, 19 and 20. For forming the openings in the strip, the apparatus shown in FIGS. 4 and 5 is preferably employed. The apparatus 25 includes a punch 26 mounted on a carriage 27 which supports an actuating mechanism 28 for the punch 26. The actuating mechanism 28 includes in this embodiment a pneumatic actuator 29 which is pivotally mounted for movement about a horizontal axis and connected to an actuating member 30 for the punch 26 through a lever 31. The carriage 27 is supported for sliding movement along a guide track 32.

The carriage 27 is normally biased towards the position of FIG. 5 by means of a spring 33 connected between the carriage 27 and a stop 34. The carriage 27 additionally supports an actuating cam 35 which is arranged to contact the lever of a limit switch 36 to cause actuation thereof. The limit switch 36 is connected to the solenoid of a control valve (not shown) which can supply air under pressure to the actuator 29 to cause actuation of same.

Connected rigidly to the carriage 27 and arranged forwardly thereof is a positioning mechanism 37 which includes an arm 38 which extends forwardly from the carriage 27 and which supports at its free end a positioning pin assembly 39 which includes a spring biased pin 40. The pin 40 includes a shoulder 41 rearwardly from its leading end whilst a part spherical collar or washer 42 is freely located about the pin 40 for a purpose which will hereinafter become apparent.

A pin lifting member 43 of a forked construction is arranged in the path of movement of the pin 40 to cause lifting of the pin 40 as described further below. As shown the lifting member 43 is curved downwardly to define a lead-in ramp 44.

Figure 6:
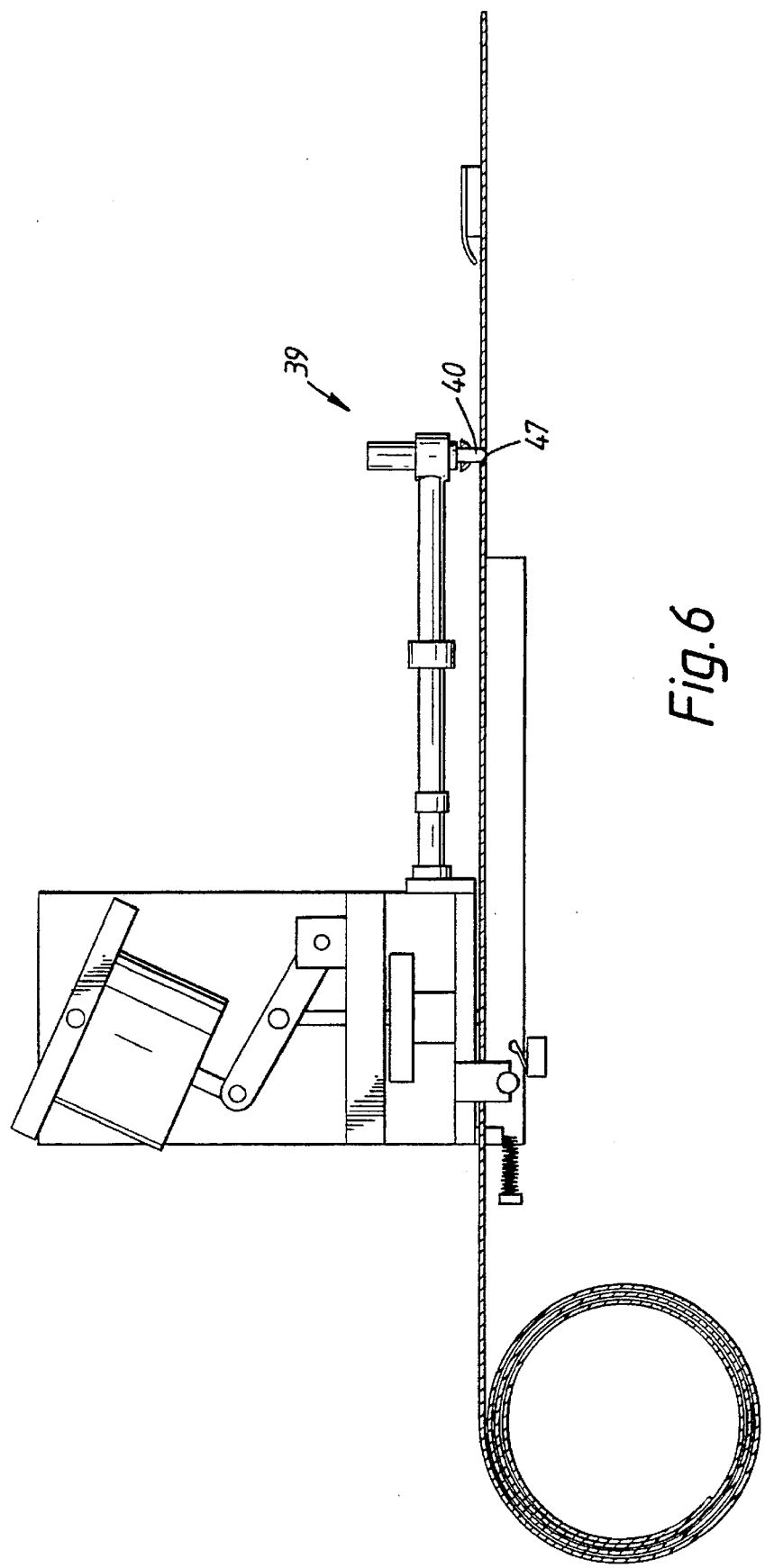
Figure 7:
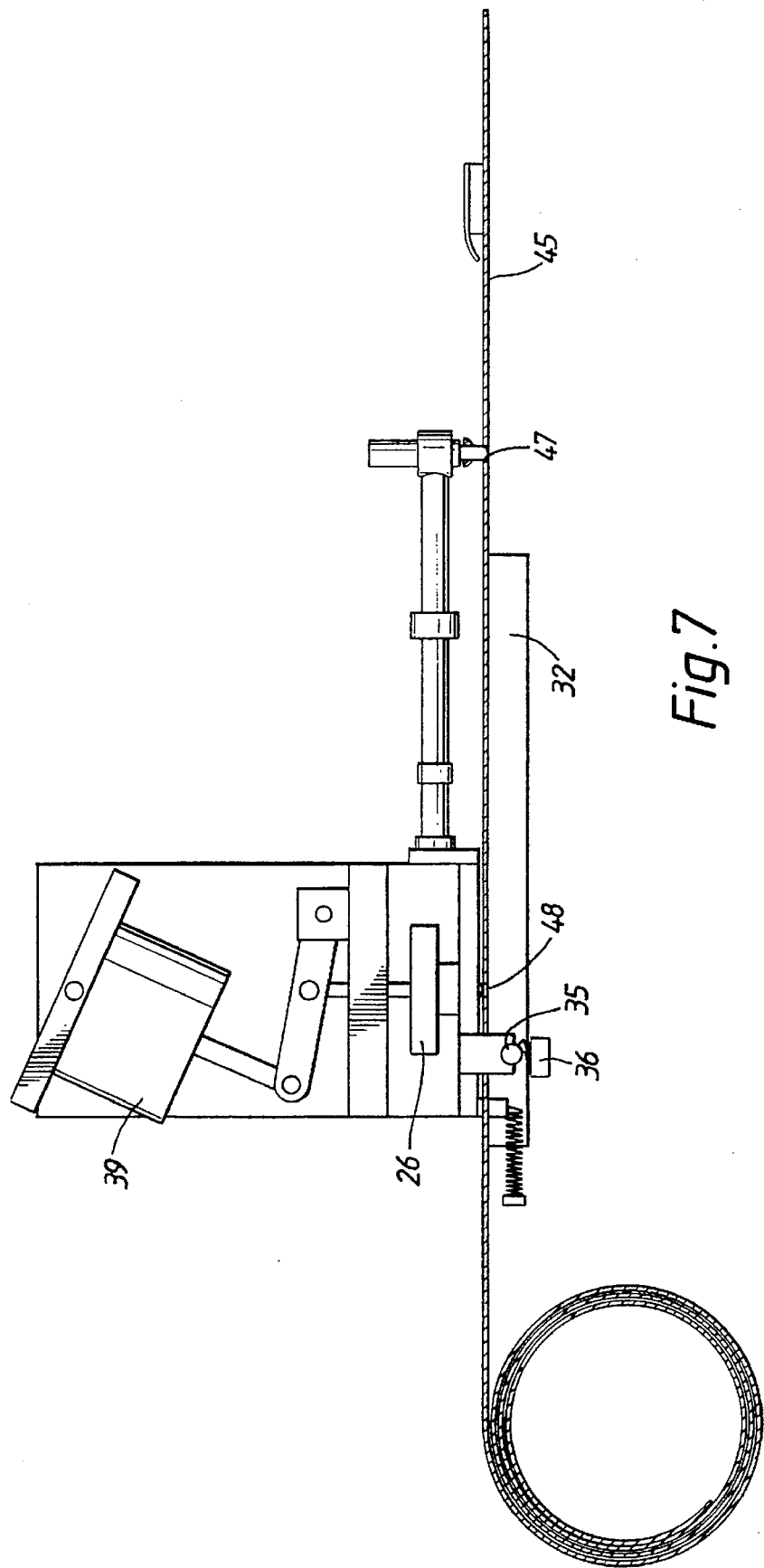
Figure 8:
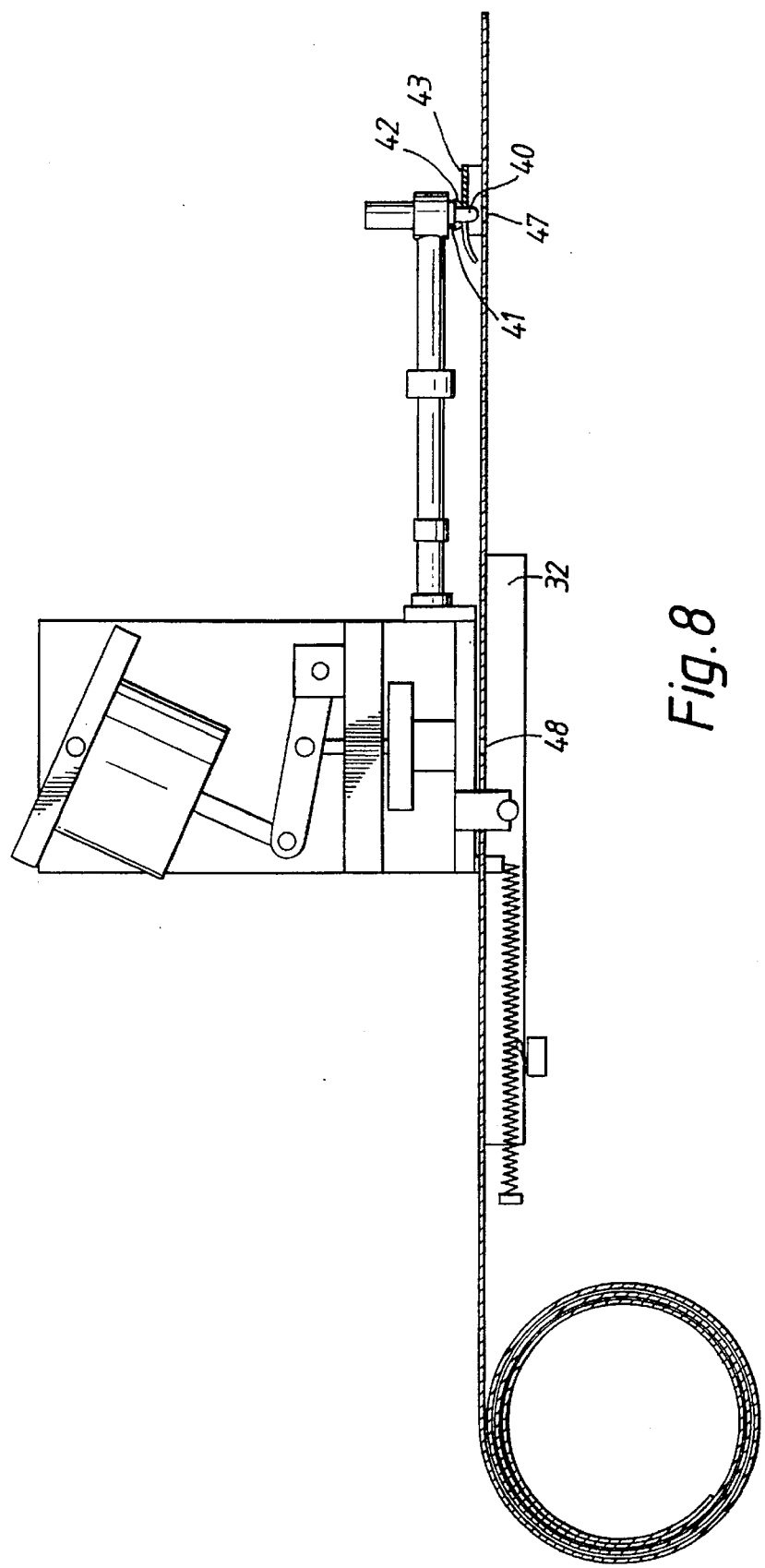

In use, the apparatus 25 is initially in the position of FIG. 5 with the carriage 27 fully retracted. A strip 45 of sheet material from a roll 46 is fed through the apparatus 25 for punching by the punch 26. Assuming an aperture 47 has initially been punched in the strip 45 movement of the strip 45 will move the aperture 47 to the position of FIG. 6 wherein the spring loaded pin 40 locates therein. Further movement of the strip 45 will cause the pin assembly 39 through its connection 38 to the carriage 27 to move with the strip 45 and pull the carriage 27 through the arm 38 against the bias of the spring 33 along the guide track 32. When the actuator cam 35 contacts the switch 36, the pneumatic actuator 29 will operate to punch the strip 45 as at 48 (see FIG. 7).

With continued movement of the strip 45, the pin 40 will reach the lifting device 43 and move in between the fork thereof. Additionally, the washer 42 will straddle the fork and ride up the ramp 44 to abut the shoulder 41 of the pin 40 and cause the pin 40 to be lifted against its spring bias from the aperture 47. As the pin 40 is now free of the aperture 47, it is no longer fixed for movement with the strip 45, which allows the spring 33 to act on the the carriage 27 to retract to the position of FIG. 5. The process then repeats to ensure that a fixed spacing is achieved between respective punched apertures, the spacing of the apertures being defined by the distance between the pin 40 and punch 26.

The punch 26 may punch apertures of any shape or size and in the case of the slat 12, apertures 20 are punched in the strip 25 only on one side, whilst in the case of the slat 11, the punch 26 includes a pair of punching tools which punch apertures 18 and 19 on both sides of the strip simultaneously.

After punching as described above, the strip 45 is then roll-formed to form the required tubular profile of FIGS. 2 and 3 which is severed at required lengths to form the slats 11 and 12. Preferably, the rolled strip overlaps adjacent one side of the slats 11 and 12 adjacent the ends 15 and 16.

Figure 9:
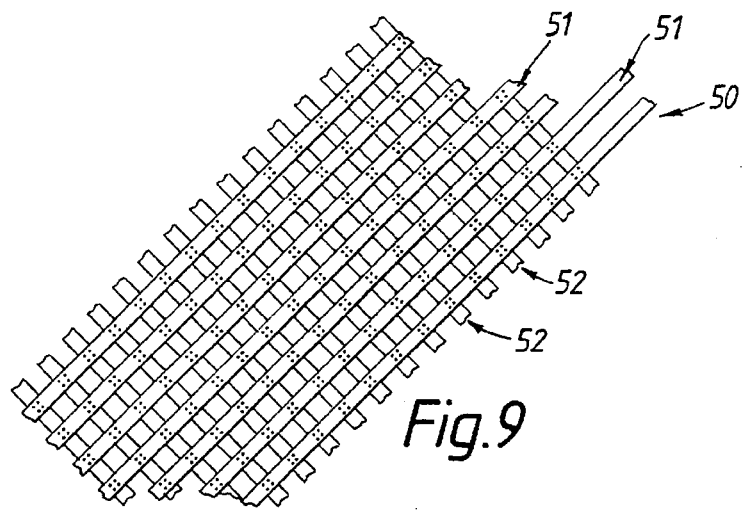
FIG. 9 illustrates lattice formed in accordance with a further embodiment of the present invention.

Referring now to FIG. 9, there is illustrated a portion of a lattice 50 formed in accordance with a further embodiment of the present invention comprising of a set of metal slats 51 arranged in a parallel, mutually spaced orientation which overlay another set of metal slats 52 which are also arranged in parallel mutually spaced orientation so as to cross the slats 51 substantially at right angles thereto.

Figure 10:
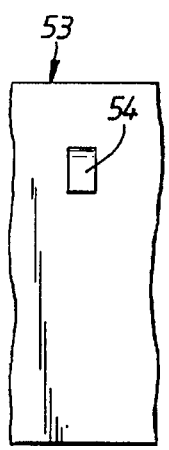
FIG. 10 is a front elevational view of a metal strip for forming slats for the lattice of FIG. 8.
Figures 11, 12:
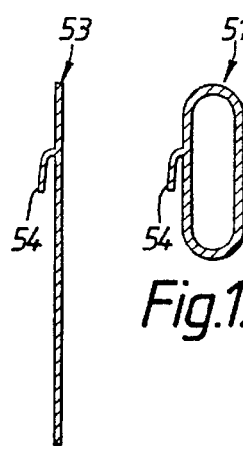
FIG. 11 is a sectional view along line A—A of FIG. 10.
FIG. 12 illustrates in sectional view a slat formed from the strip of FIG. 10.
Figure 16:
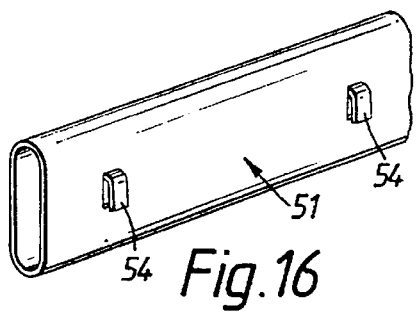
FIGS. 16 and 17 illustrate in perspective view the respective slats of the lattice.

The slats 51 are formed as shown in FIGS. 10 and 11 from strips 53 of flat material suitably metal which is provided at spaced apart positions with a plurality of tongues 54 which extend transversely of the strip 53 and which are pressed out of the normal plane of the strip 53 as more clearly shown in FIG. 11. The tongues 54 thus remain connected and integral with the strip 53 at one end but are free at their other end and spaced from the strip 53. The slats 51 are then formed by rolling the strip 53 to the closed hollow tubular form shown in FIG. 12 and 16 having the tongues 54 projecting from one face 55 of the slats 52.

Figures 13, 14:
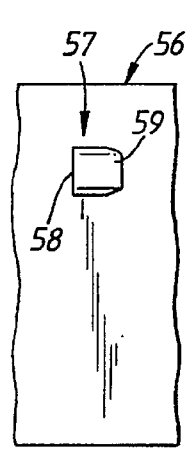
FIG. 13 illustrates in front elevational view a metal strip for forming a further form of slat for the lattice of FIG. 9.
FIG. 14 is an end elevational view of the slat of FIG. 13.
Figure 15:
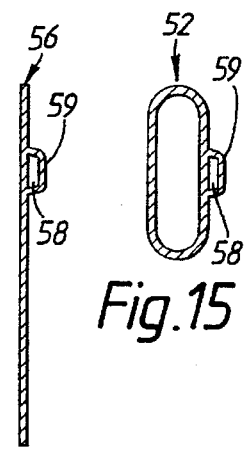
FIG. 15 illustrates in sectional view a slat formed from the strip of FIG. 13.
Figure 17:
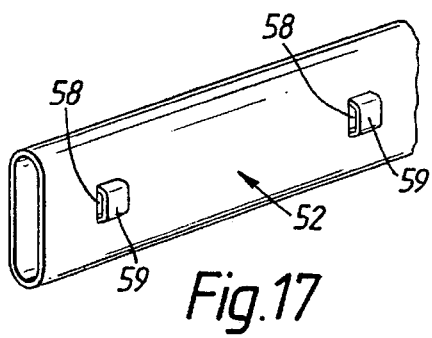

The slats 52 of the second set are formed from a further strip 56 of metal as shown in FIG. 13. In this instance however the strip 56 is punched at 57 at spaced positions corresponding to the desired crossing points of the slats 51 and 52 so as to form in the strip 57 spaced slots 58 which are disposed out of the plane of the strip 56 and extend transversely of the strip 53. Punching of the strip 56 at the position 57 also pushes portion of the strip 53 out of the plane of the strip 53 to forms recesses 59 in the strip 56 rearwardly of the slots 58 so as to receive the tongues 54 of the slats 51 as described further below. The strips 56, after formation of the slots 58 are rolled into the hollow form shown in FIG. 15 and 17 so that the slots 58 are in one side face 60 of the slats 52.

Figure 18:
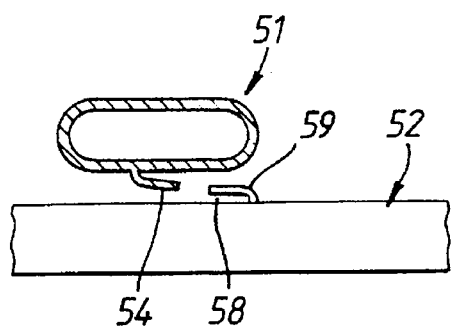
FIG. 18 illustrates the relationship between the slats of FIGS. 16 and 17 prior to interconnection.
Figure 19:
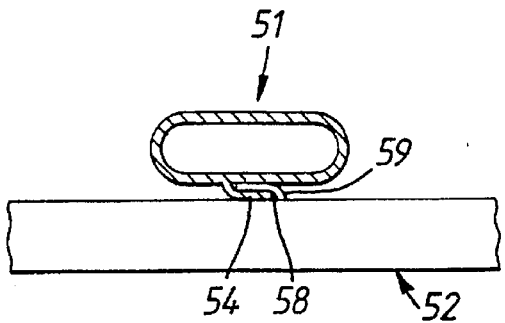
FIG. 19 illustrates interconnected slats of FIG. 18.
Figure 20:
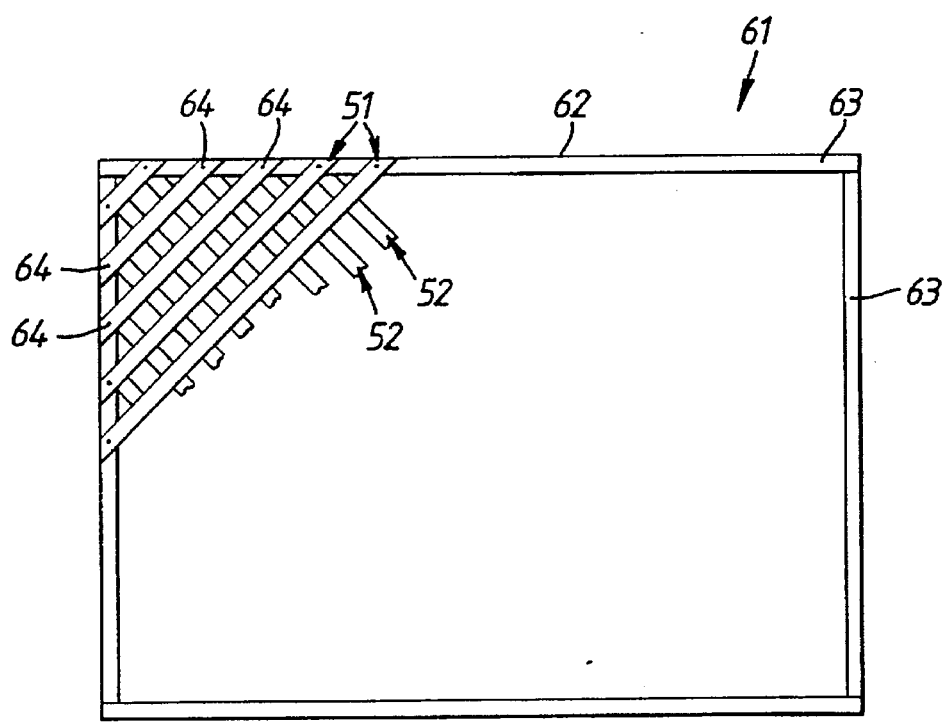
FIG. 20 illustrates a typical lattice panel according to the invention.

For assembly the respective slats 51 and 52 are arranged substantially at right angles to each other with the respective tongues 54 located adjacent the slots 58 as shown in FIG. 18. The slats 51 and 52 are then slid or moved relative to each other so that the tongues 54 pass into the slots 58 and locate substantially within the recesses 59. This positively positions the slats 51 relative to the slats 52. This procedure is, repeated at each crossing point between the slats 51 and 52.

To hold the respective slats 51 and 52 in this position they may be supported in an external frame or alternatively secured together by fasteners passed through the crossing slats. A typical assembled panel 61 is show in FIG. 18. In this panel, the respective slats 51 and 52 are interlocked as described above and secured to a perimeter frame 62 comprising interconnected frame members 63. The slats 51 and 52 may be connected to the perimeter frame members 63 by fasteners 64 such as screws or rivets so as to hold the slats 51 and 52 interlocked through the tongue 54/slot 58 engagement. Of course, the perimeter frame 62 may be of many different forms and may for example comprise channel shaped frame members 63 to receive the ends of the slats 51 and 52 which are secured to the frame members 63 by fasteners as before.

The formations in the strips 53 and 56 may be made by using the punching apparatus 25 of FIG. 5 by selecting and using punching tools of the required shape to form the tongue 54 and slots 58. The apparatus 25 will ensure that these formations are produced at the required even spacing.

Whilst the interlocking means for the lattice slats in this embodiment preferably comprise tongues and slots other alternative interlocking means may also be used. For example both sets of slats may be provided with spaced interlockable tongues or alternatively the slats of one set may be formed with integral eyes or loops to receive tongues or projections of the other slats.

The lattice is suitably produced from light gauge prepainted metal strip which can be finished in a variety of colours which requires little or no maintenance. The overall appearance of the coloured metal lattice is aesthetically pleasing and because of its rigid character and pro-environmental qualities, provides substantial advantages over existing lattice. Additionally, the nature of the materials which form the lattice and the nature of assembly permit the lattice to curved to form desired shapes whilst retaining its constructional integrity.

What is claimed is:

1. A method of manufacturing metal lattice comprising a plurality of first and second slats, said slats being formed from metal strips and having a hollow cross section and opposite side faces, said method including the steps of forming apertures in said strips such that the opposite side faces of said first slats have aligned apertures and said second slats have apertures in one said side face, placing said first slats in an overlying relationship to said second said slats so that said apertures are aligned, and interconnecting said first and second slats by fastener means passed through said apertures in said first and second slats.

2. A method according to claim 1 wherein said slats are formed by roll forming said strips of sheet metal into a hollow form.

3. Metal lattice comprising a plurality of first and second slats, said slats having a hollow cross section and opposite side faces, said first slats having aligned apertures in opposite side faces and said second slats having apertures in one side face, said first slats overlying said second slats so that said apertures are aligned, said slats being interconnected by fastener means passing through said apertures in said first and second slats.

4. Metal lattice according to claim 3 wherein said slats are formed from strips of sheet metal which are rolled form into a hollow profile or form.

5. Metal lattice according to claim 4 wherein said apertures in said slats are formed in said strips of sheet material prior to roll forming.

6. Metal lattice according to claim 5 wherein said said slats have substantially flat opposite side faces.

7. Metal lattice according to claim 4, wherein said apertures which are on side faces of said first slats adjacent to said second slats of larger size than said apertures which are on said opposite side faces of said first slats.

8. Metal lattice according to claim 4 wherein said fastener means comprise rivets.

9. A method of manufacturing steel lattice comprising a plurality of first and second slats, said first and second slats being formed from metal strips having a hollow cross-section opposite side faces, said method including the steps of punching said strips to form in said slats apertures in adjacent side faces of said slats and to form tongues adjacent said apertures in said first slats, placing said first slats in an overlying relationship to said second slats so that said apertures are aligned, and inserting said tongues into said apertures in said second slats to interconnect said slats.

10. A method according to claim 9 wherein said apertures in said second slats comprise slots and wherein recesses are formed in said second slats rearwardly of said slots to receive said tongues of said first slats.

11. Metal lattice comprising a plurality of first and second slats, said slats having a hollow cross section and opposite side faces, said first slots having tongues projecting from one side face and said second slats having apertures in one side face, said first slats overlying said second slats so that said tongues of said first slats project into said apertures in said second slats to interconnect said slats.

* * * * *